US012723744B2

(12) United States Patent
Hsu

(10) Patent No.: US 12,723,744 B2
(45) Date of Patent: Sep. 1, 2026

(54) FIBER OPTIC GROUND SPIKE LIGHT FIXTURE

(71) Applicant: DONGGUAN JIASHENG LIGHTING TECHNOLOGY CO., LTD., Dongguan (CN)

(72) Inventor: Chih-Pin Hsu, Dongguan (CN)

(73) Assignee: DONGGUAN JIASHENG LIGHTING TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 19/016,110

(22) Filed: Jan. 10, 2025

(65) Prior Publication Data

US 2026/0168657 A1 Jun. 18, 2026

(30) Foreign Application Priority Data

Dec. 13, 2024 (CN) ......................... 202423091775.2

(51) Int. Cl.
*F21V 21/08* (2006.01)
*F21V 8/00* (2006.01)

(52) U.S. Cl.
CPC ........ *F21V 21/0824* (2013.01); *G02B 6/0005* (2013.01)

(58) Field of Classification Search
CPC .......................... F21V 21/0824; G02B 6/0005
See application file for complete search history.

(56) References Cited

U.S. PATENT DOCUMENTS 5,283,849 A * 2/1994 Cooke .................. G02B 6/3861 385/84
5,577,149 A * 11/1996 Averbeck ................ B24B 41/06 385/85
5,606,637 A * 2/1997 Dolby ..................... F21V 17/04 385/115
6,058,230 A * 5/2000 Ward .................. G02B 6/4298 385/139
6,137,812 A * 10/2000 Hsu ......................... H01S 3/067 372/6
6,398,397 B1 * 6/2002 Koren .................. G02B 6/0008 362/101
6,655,818 B2 * 12/2003 Liu ......................... F21V 21/02 362/152

(Continued)

FOREIGN PATENT DOCUMENTS

CA 2339460 C * 8/2005

*Primary Examiner* — Thien M Le
*Assistant Examiner* — Asifa Habib

(57) ABSTRACT

Disclosed is a fiber optic ground spike light fixture, including a ground spike assembly configured to be inserted into a ground to assist in fixing the fiber optic ground spike light fixture; a lamp body assembly detachably connected to the ground spike assembly; and a fiber optic bundle including a plurality of linear optical fibers, with one end of the fiber optic bundle being fixed inside the lamp body assembly, and the other end thereof extending from the lamp body assembly to form a light source for the fiber optic ground spike light fixture. The present disclosure adopts a fiber optic bundle composed of a plurality of linear optical fibers as a light source, and can realize various lighting and shadow effects such as single beam light, multiple beam light, linear light, and point light.

6 Claims, 7 Drawing Sheets

(56) References Cited

U.S. PATENT DOCUMENTS

| | | | | |
|---|---|---|---|---|
| 7,073,932 | B2 * | 7/2006 | Wainwright | G02B 6/0008 362/555 |
| 9,927,581 | B1 * | 3/2018 | Rosson | G02B 6/3898 |
| 2008/0152287 | A1 * | 6/2008 | Ip | G02B 6/0008 385/115 |
| 2008/0285299 | A1 * | 11/2008 | Ip | F21V 21/0824 362/554 |
| 2011/0252634 | A1 * | 10/2011 | Pons | G02B 6/3861 29/729 |
| 2016/0077300 | A1 * | 3/2016 | Geens | G02B 6/4457 385/136 |
| 2018/0078311 | A1 * | 3/2018 | Scheller | A61B 18/24 |
| 2021/0062992 | A1 * | 3/2021 | Beauchamp | B60Q 1/30 |
| 2023/0167969 | A1 * | 6/2023 | Kennedy | F21V 21/0824 362/396 |

* cited by examiner

FIBER OPTIC GROUND SPIKE LIGHT FIXTURE

TECHNICAL FIELD

The present disclosure relates to the technical field of lighting fixtures, and particularly relates to a fiber optic ground spike light fixture.

BACKGROUND

As a multifunctional lighting device, ground spike light fixtures are widely used in outdoor environments. At night, the ground spike light fixtures can be used to illuminate key locations such as sidewalks, stairs, and entrances, providing clear path guidance for pedestrians and improving the safety of walking at night. The ground spike light fixtures can also be installed in gardens, parks, courtyards and other places. By illuminating landscape elements such as trees, flower-beds, and sculptures, the ground spike light fixtures can enhance the visual effect at night and create a warm and romantic atmosphere.

At present, most of the ground spike light fixtures on the market use point light sources. Restricted by the design of traditional ground spike light fixtures using the point light sources, the ground spike light can only give single decorative effect. Moreover, the ground spike light fixtures using the point light sources usually only areas around them, dark areas are easily to be formed between a plurality of light fixtures, resulting in uneven lighting. In order to avoid the dark areas, strong-intensity point light sources can be used, which could lead to glare and affect visual comfort. Therefore, the ground spike light fixtures in the prior art have the problems of single decorative effect, poor lighting effect and low visual comfort.

Therefore, the prior art needs to be further improved and developed.

SUMMARY

In view of the deficiencies in the prior art, the present disclosure aims to provide a fiber optic ground spike light fixture, which can provide rich lighting and shadow decorative effects using different types of optical fibers, thereby solving the problems of single decorative effect, poor lighting effect and low visual comfort of the ground spike light fixtures in the prior art.

The technical solution of the present disclosure is as follows:

a fiber optic ground spike light fixture, including:

a ground spike assembly, where the ground spike assembly is configured to be inserted into a ground to assist in fixing the fiber optic ground spike light fixture;

a lamp body assembly, where the lamp body assembly is detachably connected to the ground spike assembly; and a fiber optic bundle, where the fiber optic bundle includes a plurality of linear optical fibers, one end of the fiber optic bundle is fixed inside the lamp body assembly, and the other end thereof extends from the lamp body assembly to form a light source for the fiber optic ground spike light fixture.

In one embodiment, the lamp body assembly includes:

a connecting portion, where the connecting portion is arranged in a vertical direction and detachably connected to the ground spike assembly; and a lamp body, where the lamp body is rotationally connected to the connecting portion, the lamp body has a hollow trumpet-shaped structure, one end of the fiber optic bundle is fixed inside the lamp body, and the other end thereof extends from a bell mouth of the lamp body, such that the lamp body can be rotated relative to the connecting portion to adjust an angle at which the fiber optic bundle extends from the lamp body.

In one embodiment, the fiber optic ground spike light fixture further includes a bundling ring, the bundling ring is sleeved over the fiber optic bundle, the bundling ring is arranged in a manner that matches the bell mouth of the lamp body and can be freely moved along the fiber optic bundle to adjust a dispersion form of the fiber optic bundle.

In one embodiment, the lamp body includes:

a connecting end, where the connecting end is pivotally connected to the connecting portion through a connecting shaft to enable the lamp body to be rotated relative to the connecting portion in a vertical plane; and a tension knob, where the tension knob is arranged on the other side of the connecting end relative to the connecting portion and is connected to the connecting shaft, such that a relative distance between the connecting end and the connecting portion on the connecting shaft is adjusted to achieve angle adjustment and fixation of the lamp body.

In one embodiment, one surface of the connecting end and one surface of the connecting portion that are opposite to each other are provided with meshing teeth, respectively, and the connecting end is meshed with the connecting portion when an angle of the lamp body is fixed.

In one embodiment, the lamp body further includes:

a power supply unit, where the power supply unit is snap-fitted and fixed at the bell mouth of the lamp body, and one end of the fiber optic bundle is fixed on the power supply unit to obtain power; and a convex rib, where the convex rib is formed on an outer wall of the lamp body in an axial direction.

In one embodiment, the ground spike assembly includes a ground spike tube and a ground spike plate, one end of the ground spike tube is detachably connected to the connecting portion to achieve a detachable connection between the lamp body assembly and the ground spike assembly; a plurality of ground spike holes are formed on the ground spike plate, one ground spike hole through which the ground spike tube passes is selected according to a center of gravity of the fiber optic ground spike light fixture, the other end of the ground spike tube passes through the one ground spike hole and is fixed on an installation surface, and the fiber optic ground spike light fixture is fixed on the installation surface through the ground spike tube and the ground spike plate.

In one embodiment, the ground spike tube includes:

a first end, where the first end is arranged above the ground spike plate, and the first end is a hollow tubular structure to match and accommodate the connecting portion, thereby achieving the detachable connection between the lamp body assembly and the ground spike assembly; and a second end, where the second end is arranged below the ground spike plate, the second end passes through the ground spike hole and is detachably connected to the first end, a first snap-fit structure is arranged on the second end facing the ground spike plate and corresponds to a second snap-fit structure on the ground spike plate, thereby achieving a snap-fit connection between the ground spike tube and the ground spike plate, and fixing the fiber optic ground spike light fixture on the installation surface.

In one embodiment, a plurality of the second snap-fit structures are arranged around the ground spike holes on the ground spike plate, the first snap-fit structure can be adapted to different second snap-fit structures, thereby achieving the adjustment of an orientation of the fiber optic ground spike light fixture.

In another embodiment, the second end of the ground spike tube forms a conical structure to facilitate the insertion of the ground spike tube into the installation surface, and the fiber optic ground spike light fixture is fixed on the installation surface through cooperation between the ground spike tube and the ground spike plate.

The present disclosure provides a fiber optic ground spike light fixture, including a ground spike assembly configured to be inserted into a ground to assist in fixing the fiber optic ground spike light fixture; a lamp body assembly detachably connected to the ground spike assembly; and a fiber optic bundle including a plurality of linear optical fibers, with one end of the fiber optic bundle being fixed inside the lamp body assembly, and the other end thereof extending from the lamp body assembly to form a light source for the fiber optic ground spike light fixture. The present disclosure adopts a fiber optic bundle composed of a plurality of linear optical fibers as a light source, and can realize various lighting and shadow effects such as single beam light, multiple beam light, linear light, and point light. Moreover, it can be combined with different forms of the ground spike light fixture, such as courtyard lamp, lawn lamp, pathway lamp, low-voltage lamp, and landscape lamp, to provide the user with rich visual effects, good lighting effects and comfortable visual experience.

BRIEF DESCRIPTION OF THE DRAWINGS

In order to more clearly illustrate the technical solution in embodiments of the present disclosure or in the prior art, a brief introduction to the accompanying drawings required for the description of the embodiments or the prior art will be provided below. Obviously, the accompanying drawings in the following description are merely some embodiments of the present disclosure. Those of ordinary skill in the art would also derive other accompanying drawings from these accompanying drawings without making inventive efforts.

DETAILED DESCRIPTIONS OF THE EMBODIMENTS

Figure 1:
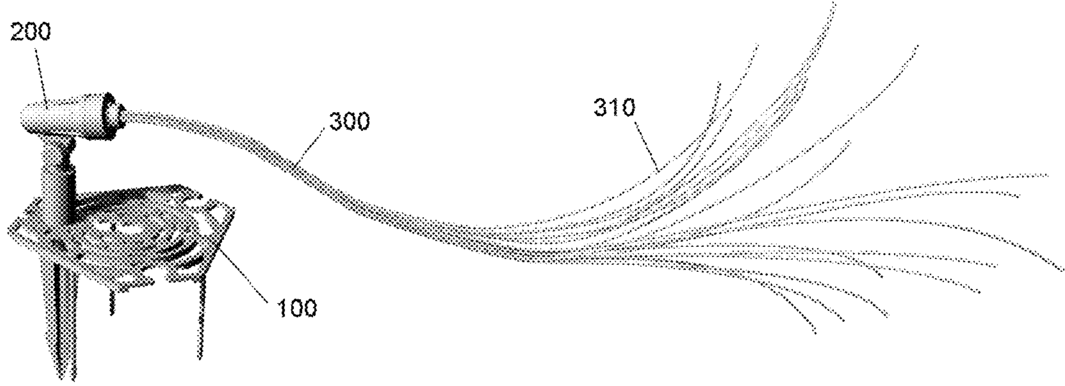
FIG. 1 is a perspective view of a fiber optic ground spike light fixture according to one embodiment of the present disclosure.

To make the objectives and technical solutions of the present disclosure clearer, the present disclosure will be described in further detail below in conjunction with the accompanying drawings and embodiments. It should be understood that particular embodiments described herein are merely illustrative of the present disclosure, and are not intended to limit the present disclosure.

It should be noted that the terms “center”, “upper”, “lower”, “left”, “right”, “inner”, “outer”, “vertical”, “horizontal”, etc. indicate azimuthal or positional relations on the basis of those shown in the drawings only for ease of description of the present disclosure and for simplicity of description, and are not intended to indicate or imply that the referenced structure must have a particular orientation and be constructed in a particular orientation, and thus may not be construed as a limitation on the present disclosure.

In addition, unless otherwise specified for the articles in the context, “a/an” and “the” can generally refer to either a single or multiple instances. Under the condition that embodiments of the present disclosure involve descriptions of “first”, “second”, etc., the descriptions of “first”, “second”, etc. are for descriptive purposes only and are not to be construed as indicating or implying their relative importance or implicitly specifying the number of indicated technical features. Thus, a feature defined with “first” and “second” may explicitly or implicitly include at least one of the features. In addition, the technical solutions of the embodiments may be combined with one another, which must be based on the achievement by those of ordinary skill in the art, and when the combinations of the technical solutions contradict one another or cannot be achieved, it should be considered that the combinations of the technical solutions do not exist and do not fall within the scope of protection claimed in the present disclosure.

Being capable of being quickly installed in different occasions, a ground spike light fixture has a wide range of applications in the field of decorative light fixtures. However, most of the spike light fixtures on the market generally use point light sources for environmental decoration, resulting a single decorative effect. Restricted by the point light sources, the ground spike light fixtures are easy to cause poor lighting effect and low visual comfort. The present disclosure discloses a fiber optic ground spike light fixture. By using a fiber optic bundle composed of a plurality of linear optical fibers as a light source, the present disclosure can achieve different visual effects, such as single beam light, multiple beam light, strip-shaped linear light, and discontinuous point light, through different installation methods and angles. Moreover, the ground spike light fixtures with different forms, such as courtyard lamp, lawn lamp, pathway lamp, low-voltage lamp, and landscape lamp, can be combined to meet lighting and shadow decorative needs of a user in different scenarios, thereby improving the landscape beauty at night, and meeting diverse courtyard lighting and shadow decorative needs.

Specifically, as shown in FIG. 1, the present disclosure provides a fiber optic ground spike light fixture, including a ground spike assembly 100, a lamp body assembly 200, and a fiber optic bundle 300, where the ground spike assembly 100 can be fixed onto an installation surface to assist in fixing the fiber optic ground spike light fixture; the lamp body assembly 200 is detachably connected to the ground spike assembly 100 to facilitate installation and removal of the fiber optic ground spike light fixture; and one end of the fiber optic bundle 300 is fixed inside the lamp body assembly 200, and the other end thereof extends from the lamp body assembly 200 to form a light source. Further, the fiber optic bundle 300 includes a plurality of linear optical fibers 310, the linear optical fibers 310 can be bundled into a single fiber optic bundle or spread out to from a plurality of fiber optic bundles, such that courtyard different lighting and shadow effects, such as single beam light, multiple beam light, strip-shaped light, and discontinuous point light, can be provided as needed.

Figure 2:
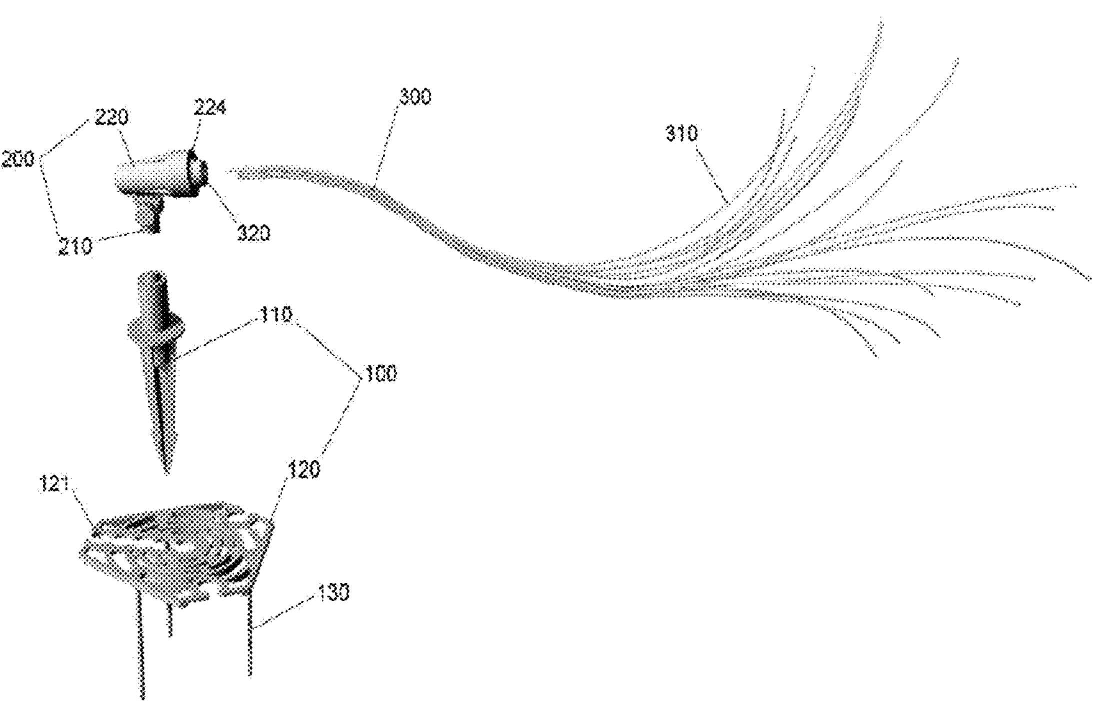
FIG. 2 is exploded view of a fiber optic ground spike light fixture according to one embodiment of the present disclosure.

Specifically, as shown in FIG. 2, the ground spike assembly 100 includes a ground spike tube 110 and a ground spike plate 120, where the ground spike tube 110 is an integrally formed structure, and one end of the ground spike tube 110 is a hollow tubular structure capable of accommodating a corresponding structure of the lamp body assembly 200, thereby achieving a detachable connection between the ground spike assembly 100 and the lamp body assembly 200; the other end of the ground spike tube 110 is a conical structure, the ground spike tube 110 passes through the ground spike plate 120 through the conical structure and is then inserted into the installation surface, thereby cooperating with the ground spike plate 120 to fix the fiber optic ground spike light fixture in a desired position.

Figure 3:
FIG. 3 is a perspective view of a ground spike assembly of a fiber optic ground spike light fixture according to one embodiment of the present disclosure.
Figure 3:
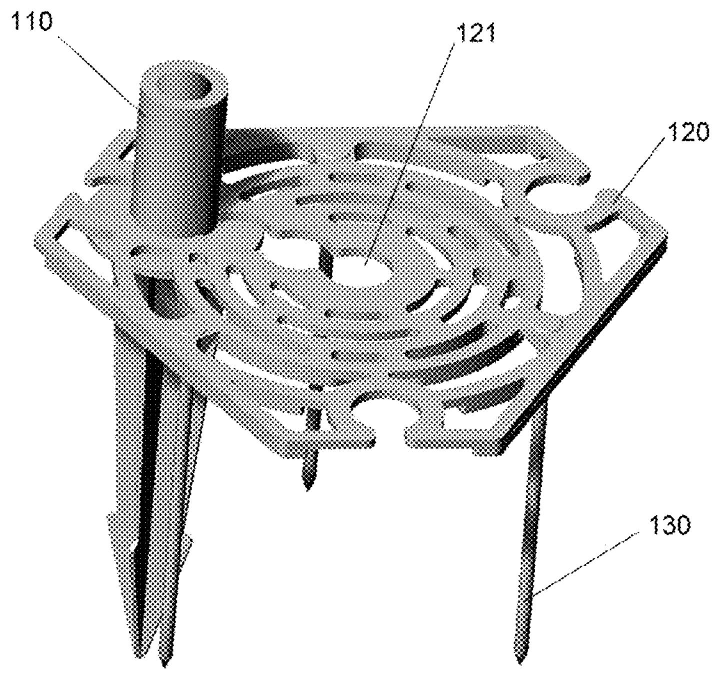

Further, as shown in FIGS. 2 and 3, the ground spike plate 120 is designed with a symmetrical structure, and a plurality of ground spike holes 121 are arranged on a symmetrical axis of the ground spike plate 120; the ground spike tube 110 can be passed through one of the ground spike holes 121 and fixedly connected to the ground spike plate 120 as needed, the conical structure of the ground spike tube 110 is inserted into a ground until the ground spike plate 120 abuts against the ground, and the ground spike plate 120 and the ground spike tube 110 cooperate to realize a fixed placement of the fiber optic ground spike light fixture. Optionally, the ground spike tube 110 is provided with an annular snap-fitting protrusion, and the annular snap-fitting protrusion is arranged below the ground spike plate 120; after the tubular end of the ground spike tube 110 is inserted through the ground spike hole 121 from below and then pushed until the annular snap-fitting protrusion abuts against the ground spike plate 120, the ground spike tube 110 is fixedly snap-fitted on the ground spike plate 120, thereby ensuring that the ground spike assembly 100, after being inserted into the ground, can be pushed to the ground spike plate 120 to abut against the ground. Further, the corresponding ground spike hole 121 through which the ground spike tube 110 passes is determined according to orientations of the lamp body assembly 200 and the fiber optic bundle 300. Further, a center of gravity of the fiber optic ground spike light fixture is determined according to a length of the fiber optic bundle 300, and the corresponding ground spike hole 121 through which the ground spike tube 110 passes is then determined. Specifically, the symmetrical axis of the ground spike plate 120 is set to be parallel to the orientations of the lamp body assembly 200 and the fiber optic bundle 300, and the corresponding ground spike hole 121 is selected in an opposite direction of the symmetrical axis of the ground spike plate 120; and when the fiber optic bundle 300 becomes longer, the center of gravity of the entire fiber optic ground spike light fixture shifts toward an extension direction of the fiber optic bundle 300, the ground spike hole 121 which is further away in the opposite direction of the symmetrical axis of the ground spike plate 120 is selected as the corresponding ground spike hole 121 through which the ground spike tube 110 passes, thereby ensuring overall balance effect of the fiber optic ground spike light fixture.

Further, as shown in FIG. 3, the ground spike assembly 100 also includes a plurality of auxiliary stakes 130. After the ground spike tube 110 passes through the ground spike hole 121, the auxiliary stakes 130 are inserted into the corresponding ground spike holes 121, such that the stability of the connection between the ground spike assembly 100 and the ground is enhanced, and a more stable installation of the fiber optic ground spike light fixture is ensured.

Figure 8:
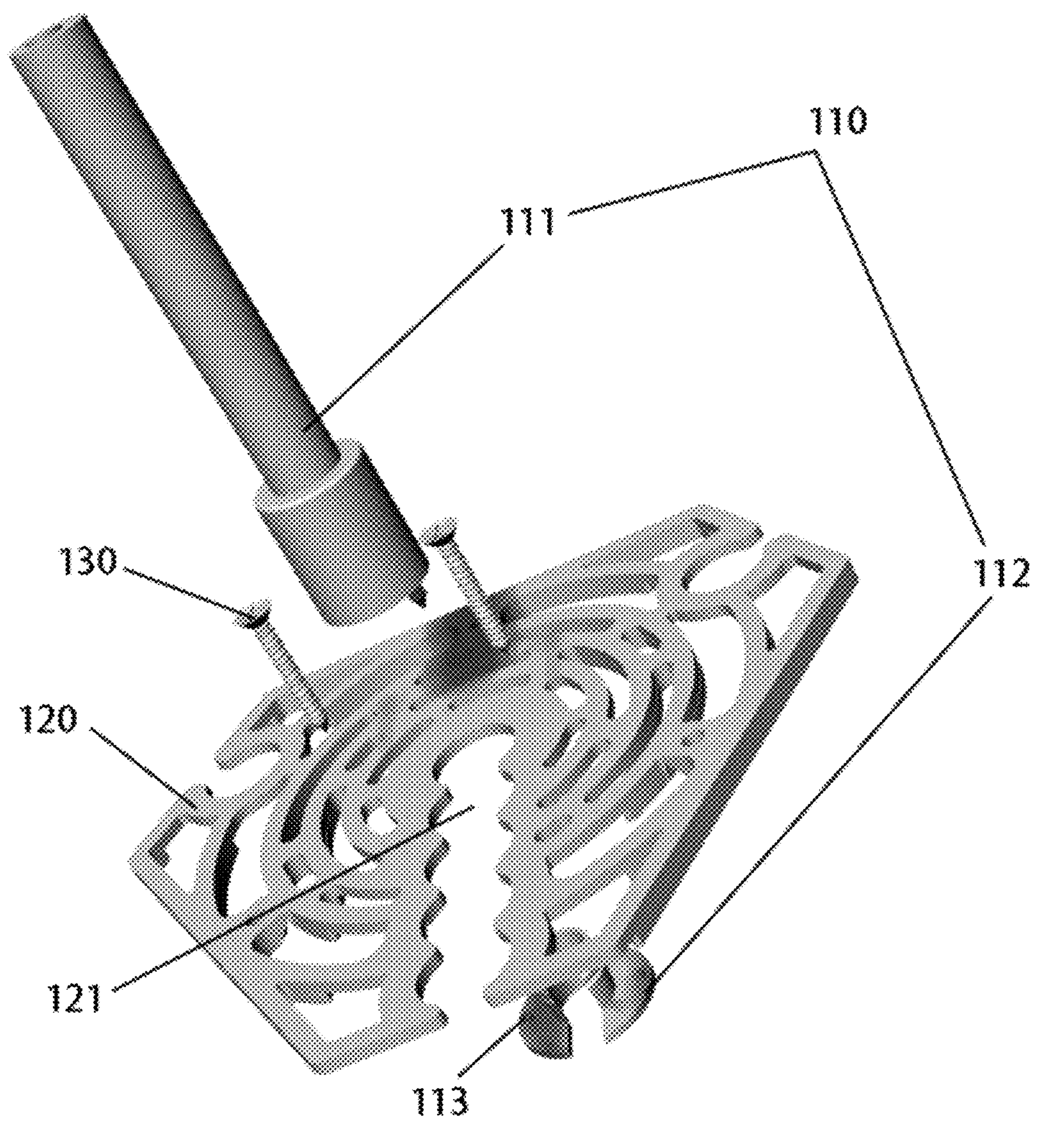
FIG. 8 is exploded view of a ground spike assembly of a fiber optic ground spike light fixture according to another embodiment of the present disclosure.

In another embodiment, the ground spike plate 120 adopts the same configuration, while the ground spike tube 110 includes a first end 111 and a second end 112 that are detachably connected, as shown in FIG. 8, where the first end 111 is arranged above the ground spike plate 120, and the first end 111 is a hollow tubular structure to match and accommodate the connecting portion 210, thereby achieving the detachable connection between the lamp body assembly 200 and the ground spike assembly 100. Optionally, the first end 111 is provided with an internal thread, a corresponding end of the connecting portion 210 is provided with an external thread, and the first end 111 is connected to the thread of the connecting portion 210, such that the lamp body assembly 200 is detachably connected to the ground spike assembly 100. Further, the second end 112 is arranged below the ground spike plate 120, and the second end 112 passes through the ground spike hole 121 on the ground spike plate 120 and is in snap-fit connection with the first end 111, thereby enabling the snap-fit connection between the ground spike tube 110 and the ground spike plate 120, and cooperating to securely fixed the fiber optic ground spike light fixture on the installation surface. Optionally, one end of the second end 112 that passes through the ground spike hole 121 is provided with an external thread, and the second end 112 and the first end 111 are in thread connection to realize the snap-fit connection between the ground spike tube 110 and the ground spike plate 120.

Figure 9:
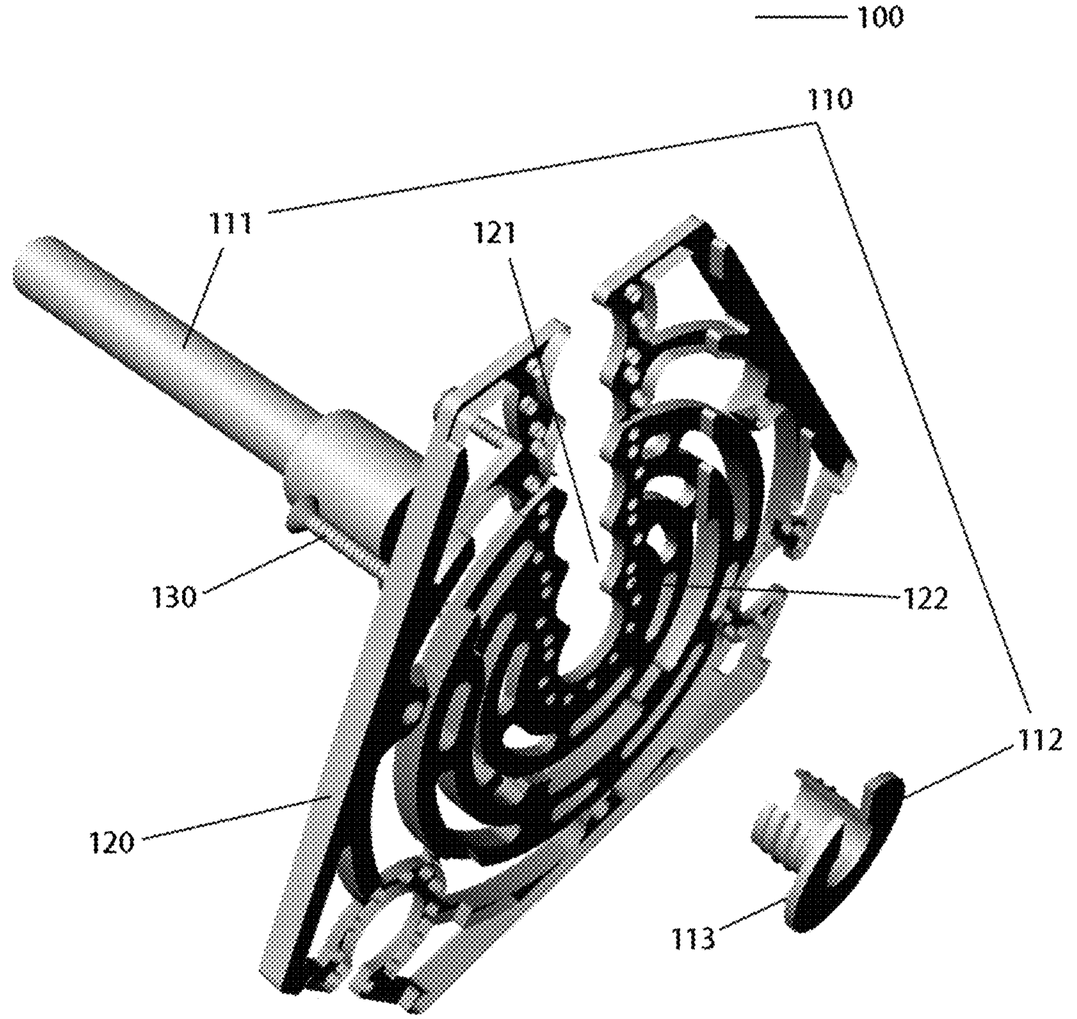
FIG. 9 is exploded view of a ground spike assembly of a fiber optic ground spike light fixture according to another embodiment of the present disclosure from another angle.

Further, as shown in FIGS. 8 and 9, a first snap-fit structure 113 is arranged on the second end 112 in a direction facing the ground spike plate 120, a second snap-fit structure 122 is arranged on the ground spike plate 120 in a direction facing the second end 112, the second end 112 is in snap-fit connection with the second snap-fit structure 122 through the first snap-fit structure 113, such that the positioning of the second end 112 relative to the ground spike plate 120 is realized; and after the second end 112 is snap-fitted and connected to the first end 111, an orientation of the ground spike plate 110 relative to the ground spike plate 120 is fixed to control an orientation of the fiber optic ground spike light fixture. Further, as shown in FIG. 9, a plurality of the second snap-fit structures 122 are arranged around the ground spike holes 121 on the ground spike plate 120. By matching the first snap-fit structure 113 on the second end 112 with different second snap-fit structures 122, the orientation of the ground spike tube 110 relative to the ground spike plate 120 can be adjusted, such that the orientation of the fiber optic ground spike light fixture is adjusted to obtain desired lighting angle and direction. Optionally, the first snap-fit structure 113 is a protrusion, and the second snap-fit structure 122 is a corresponding matching recess; or the first snap-fit structure 113 is a boss, and the second snap-fit structure 122 is a corresponding groove; or the first snap-fit structure 113 and the second snap-fit structure 122 are snap-fit structure of other matching forms to achieve the positioning and orientation of the ground spike tube 110 relative to the ground spike plate 120, such that the orientation of the fiber optic ground spike light fixture can be adjusted.

Optionally, as shown in FIG. 9, a side of the second end 112 away from the ground spike plate 120 is a plane. After the first end 111 and the second end 112 are connected to enable the snap-fit connection of the ground spike tube 110 and the ground spike plate 120, the ground spike plate 120 is fixed on the installation surface through the auxiliary stakes 130, thereby fixing the fiber optic ground spike light fixture on the installation surface. In another embodiment, the second end 112 forms a conical structure on a side away from the ground spike plate 120, such that the ground spike tube 110 can be inserted into the installation surface conveniently after the first end 111 is in snap-fit connection with the second end 112, and the fiber optic ground spike light fixture is fixed on the installation surface through the cooperation between the ground spike tube 110 and the ground spike plate 120. By changing configuration of the second end 112, the ground spike assembly 100 can be matched with different installation surfaces, such as lawn, soil, concrete, wooden floor or wall, and installation surfaces on which large insertion ports are not allowed to be made, such as desktop, wall and ground, which extends use scenarios of the fiber optic ground spike light fixture, facilitates the use of the fiber optic ground spike light fixture in different scenarios and provides desired lighting and shadow effects as needed.

Figure 4:
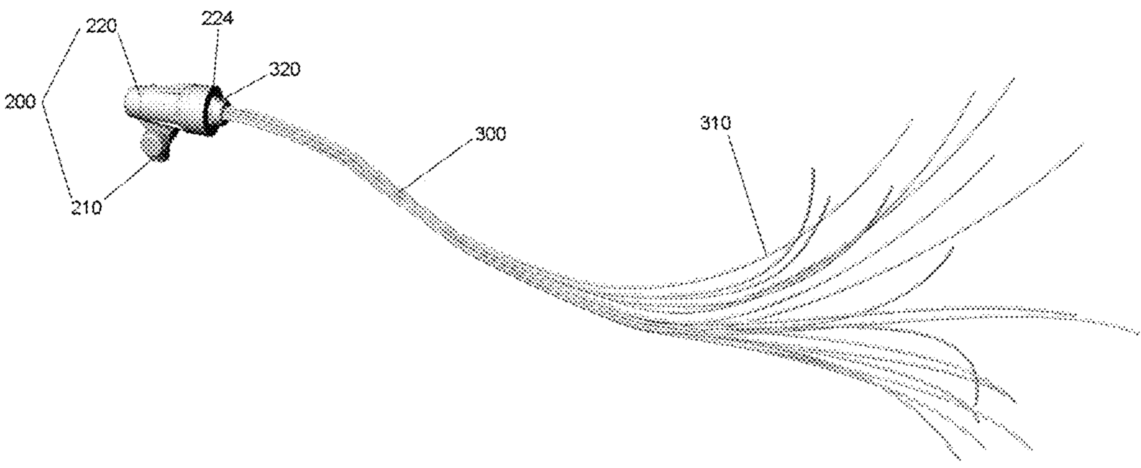
FIG. 4 is a perspective view of a lamp body assembly of a fiber optic ground spike light fixture connected to a fiber optic bundle according to one embodiment of the present disclosure.
Figure 5:
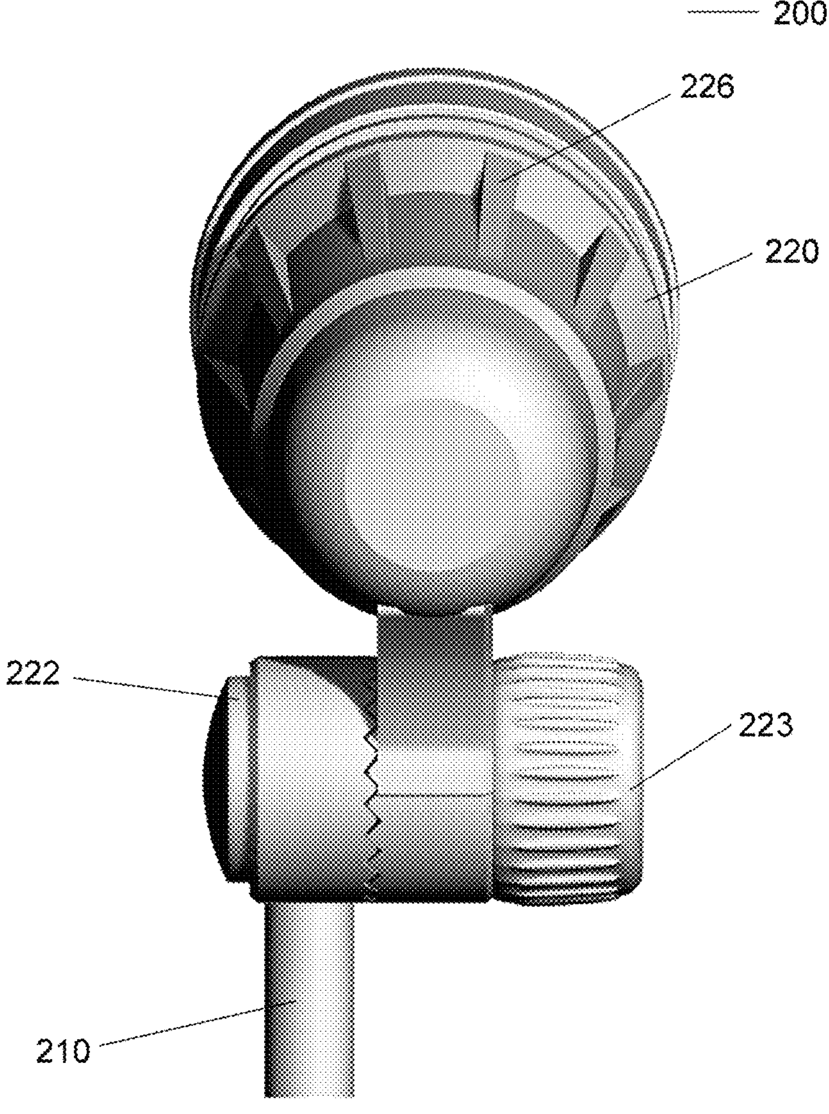
FIG. 5 is a left view of a lamp body assembly of a fiber optic ground spike light fixture according to one embodiment of the present disclosure.

Specifically, as shown in FIGS. 4 and 5, the lamp body assembly 200 includes a connecting portion 210 and a lamp body 220 rotationally connected to the connecting portion 210. The connecting portion 210 is arranged in a vertical direction, the lamp body 220 is pivotally connected to the connecting portion 210, and can rotate in a vertical plane to adjust an angle at which the fiber optic bundle 300 extends from the lamp body 220.

Further, as shown in FIGS. 2 and 5, one end of the connecting portion 210 is a cylindrical structure with an inner diameter that matches the hollow tubular structure of the ground spike tube 110, and the connecting portion 210 is inserted into one end of the hollow tubular structure of the ground spike tube 110 to achieve the detachable connection between the lamp body assembly 200 and the ground spike assembly 100. Optionally, the connecting portion 210 is in threaded connection with the ground spike tube 110 through thread; or the connecting portion 210 is in tensioning connection with the ground spike tube 110 through a tensioning structure; or the connecting portion 210 is set as an elastic structure, with a size slightly larger than an inner diameter of the ground spike tube 110, such that a detachable connection between the connecting portion 210 and the ground spike tube 110 can be achieved by friction. All detachable connection methods capable of realizing the detachable connection between the connecting portion 210 and the ground spike tube 110 can be applied to the fiber optic ground spike light fixture in the present disclosure.

Figure 6:
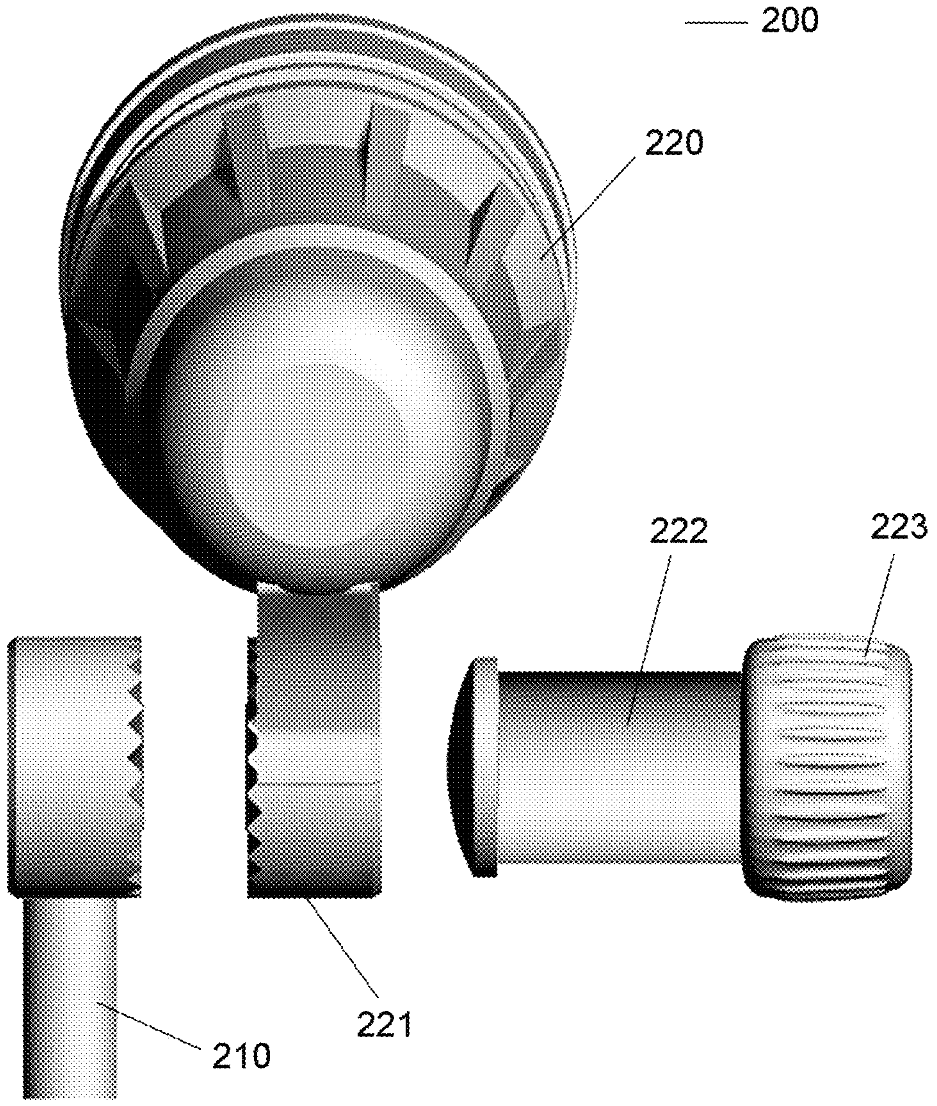
FIG. 6 is exploded view of a lamp body assembly of a fiber optic ground spike light fixture according to one embodiment of the present disclosure.

Further, as shown in FIGS. 5 and 6, the other end of the connecting portion 210 corresponds to a connecting end 221 of the lamp body 220, and a connecting shaft 222 arranged in a horizontal direction passes through both the connecting portion 210 and the connecting end 221 to achieve a pivotal connection between the connecting portion 210 and the connecting end 221, such that an orientation angle of the lamp body 220 in a vertical plane can be adjusted as needed.

Further, the connecting shaft 222 extends through the connecting end 221 and is provided with a tension knob 223 on the other side of the connecting end 221 relative to the connecting portion 210. By rotating the tension knob 223, a distance between one surface of the connecting end 221 and one surface of the connecting portion 210 that are opposite each other on the connecting shaft 222 can be adjusted, such that precise angle adjustment and fixation of the lamp body 220 can be achieved. Specifically, by tightening the tension knob 223, the connecting end 221 and the connecting portion 210 are abutted against each other on their opposite surfaces, and the lamp body 220 is fixed by fraction; by loosening the tension knob 223, the connecting end 221 and the connecting portion 210 are separated from each other on their opposite surfaces, such that an angle of the lamp body 220 in the vertical plane can be easily adjusted, and the tension knob 223 is tightened again once a desired angle is reached, and the lamp body 220 is fixed by fraction between the two opposite surfaces of the connecting end 221 and the connecting portion 210, thereby fixing an orientation of the fiber optic bundle 300. Further, one surface of the connecting end 221 and one surface of the connecting portion 210 that are opposite to each other are provided with meshing teeth, When the tension knob 223 is tightened, the connecting end 221 and the connecting portion 210 are meshed with each other, such that the lamp body 220 is more securely fixed to prevent the lamp body 220 from drooping due to an excessive length of the fiber optic bundle 300.

Figure 7:
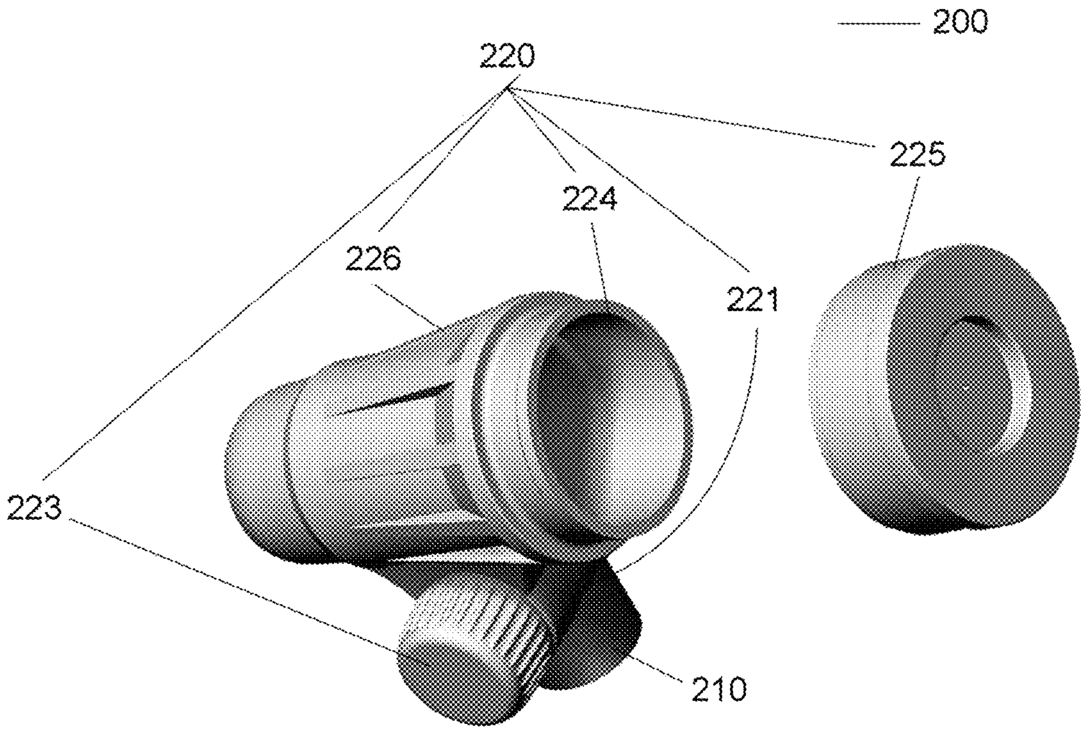
FIG. 7 is exploded view of a lamp body assembly of a fiber optic ground spike light fixture according to one embodiment of the present disclosure from another angle.

Further, as shown in FIGS. 4 and 7, the lamp body 220 has a hollow trumpet-shaped structure, and one end of the fiber optic bundle 300 is fixed inside the lamp body 220 and extends from a bell mouth 224 of the lamp body 220. Further, the trumpet-shaped structure of the lamp body 220 is fixed vertically to the connecting end 221 to ensure that the lamp body 220 can rotate and be fixed relative to the connecting portion 210 following the connecting end 221, such that the orientation angle of the lamp body 220 can be adjusted easily and quickly. Optionally, the lamp body 220 corresponds to different forms of lamp body structure, such as courtyard lamp, lawn lamp, pathway lamp, low-voltage lamp, and landscape lamp, so as to enable the fiber optic bundle 300 to match and cooperate with different types of ground spike light fixture.

Specifically, as shown in FIG. 7, the lamp body 220 is further provided with a power supply unit 225 therein, the power supply unit 225 is snap-fitted at the bell mouth 224 and is fixedly connected to one end of the fiber optic bundle 300 that extends into the lamp body 220, to supply power to the fiber optic bundle 300. Optionally, the power supply unit 225 is a rechargeable battery, such as a solar rechargeable battery. Optionally, the power supply unit 225 is connected to an external power source via a power cord to supply power to the fiber optic bundle 300. Optionally, the lamp body 220 is further provided with a control chip (not shown in the figure) therein, which is electrically connected to both the power supply unit 225 and the fiber optic bundle 300, and a light emission mode of the fiber optic bundle 300 can be set as needed, such that courtyard different lighting and shadow effects, such as single beam light, multiple beam light, strip-shaped light, and discontinuous point light, can be provided according to actual needs of the user.

Further, as shown in FIGS. 5 and 7, a plurality of convex ribs 226 are formed on a surface of the trumpet-shaped structure of the lamp body 220 in an axial direction, the plurality of convex ribs 226 are evenly spaced and symmetrically arranged to provide the user with a position to grasp the lamp body 220 while ensuring the aesthetics of overall structure, such that the user can easily grasp the lamp body 220 to adjust the orientation angle of the lamp body 220 in the vertical plane, and facilitate the installation and removal of the lamp body assembly 200 relative to the ground spike assembly 100.

Further, as shown in FIGS. 2 and 4, the fiber optic ground spike light fixture is provided with a bundling ring 320 on the fiber optic bundle 300, and the bundling ring 320 is sleeved over the fiber optic bundle 300 and surrounds all the linear optical fibers 310. The bundling ring 320 can be freely moved along the fiber optic bundle 300 to adjust a bundling position of the linear optical fibers 310 in the fiber optic bundle 300, thereby adjusting a dispersion form of the fiber optic bundle 300 to achieve the switching between single beam light and multiple beam light. Further, the bundling ring 320 is sized to match the bell mouth 224 of the lamp body 220, the bundling ring 320 is clamped on the bell mouth 224 in an initial state, in which case, all the linear optical fibers 310 in the fiber optic bundle 300 are fully dispersed; and the bundling ring 320 can be removed and moved along the fiber optic bundle 300 to a desired position in a use state, so as to achieve a desired dispersion state of the fiber optic bundle 300. The lamp body 220 can be then rotated relative to the connecting portion 210 and fixed at a desired angle, such that the fiber optic bundle 300 can form a light source at desired angle and state, which can better adapt to the lighting needs of different environments and occasions. Therefore, no matter whether spotlighting or diffused light is required, the user can easily adjust to obtain ideal lighting effects, which greatly improves the practicality and user experience of the fiber optic ground spike light fixture.

In conclusion, the present disclosure provides a fiber optic ground spike light fixture, including a ground spike assembly configured to be inserted into a ground to assist in fixing the fiber optic ground spike light fixture; a lamp body assembly detachably connected to the ground spike assembly; and a fiber optic bundle including a plurality of linear optical fibers, with one end of the fiber optic bundle being fixed inside the lamp body assembly, and the other end thereof extending from the lamp body assembly to form a light source for the fiber optic ground spike light fixture. The present disclosure adopts a fiber optic bundle composed of a plurality of linear optical fibers as a light source, and can realize various lighting and shadow effects such as single beam light, multiple beam light, linear light, and point light. Moreover, it can be combined with different forms of the ground spike light fixture, such as courtyard lamp, lawn lamp, pathway lamp, low-voltage lamp, and landscape lamp, to provide the user with rich visual effects, good lighting effects and comfortable visual experience.

It should be understood that the application of the present disclosure is not limited to the above examples. For those ordinarily skilled in the art, improvements or variations can be made based on the foregoing description, and all these improvements or variations shall fall within the scope of protection of the appended claims of the present disclosure.

What is claimed is:

1. A fiber optic ground spike light fixture, comprising:

a ground spike assembly, wherein the ground spike assembly is configured to be inserted into a ground to assist in fixing the fiber optic ground spike light fixture;

a lamp body assembly, wherein the lamp body assembly is detachably connected to the ground spike assembly; and a fiber optic bundle, wherein the fiber optic bundle comprises a plurality of linear optical fibers, one end of the fiber optic bundle is fixed inside the lamp body assembly, and the other end thereof extends from the lamp body assembly to form a light source for the fiber optic ground spike light fixture;

wherein the lamp body assembly comprises:

a connecting portion, wherein the connecting portion is arranged in a vertical direction and detachably connected to the ground spike assembly; and a lamp body, wherein the lamp body is rotationally connected to the connecting portion, the lamp body has a hollow trumpet-shaped structure, one end of the fiber optic bundle is fixed inside the lamp body, and the other end thereof extends from a bell mouth of the lamp body, such that the lamp body can be rotated relative to the connecting portion to adjust an angle at which the fiber optic bundle extends from the lamp body;

wherein the ground spike assembly comprises a ground spike tube and a ground spike plate, one end of the ground spike tube is detachably connected to the connecting portion to achieve a detachable connection between the lamp body assembly and the ground spike assembly; and a plurality of ground spike holes are formed on the ground spike plate, one ground spike hole through which the ground spike tube passes is selected according to a center of gravity of the fiber optic ground spike light fixture, the other end of the ground spike tube passes through the one ground spike hole and is fixed on an installation surface, and the fiber optic ground spike light fixture is fixed on the installation surface through the ground spike tube and the ground spike plate;

wherein the ground spike tube comprises:

a first end, wherein the first end is arranged above the ground spike plate, and the first end is a hollow tubular structure to match and accommodate the connecting portion, thereby achieving the detachable connection between the lamp body assembly and the ground spike assembly; and a second end, wherein the second end is arranged below the ground spike plate, the second end passes through the ground spike hole and is detachably connected to the first end, a first snap-fit structure is arranged on the second end facing the ground spike plate and corresponds to a second snap-fit structure on the ground spike plate, thereby achieving a snap-fit connection between the ground spike tube and the ground spike plate, and fixing the fiber optic ground spike light fixture on the installation surface;

wherein a plurality of the second snap-fit structures are arranged around the ground spike holes on the ground spike plate, and the first snap-fit structure can be adapted to different second snap-fit structures, thereby achieving the adjustment of an orientation of the fiber optic ground spike light fixture.

2. The fiber optic ground spike light fixture according to claim 1, further comprising a bundling ring, wherein the bundling ring is sleeved over the fiber optic bundle, the bundling ring is arranged in a manner that matches the bell mouth of the lamp body and can be freely moved along the fiber optic bundle to adjust a dispersion form of the fiber optic bundle.

3. The fiber optic ground spike light fixture according to claim 1, wherein the lamp body comprises:

a connecting end, wherein the connecting end is pivotally connected to the connecting portion through a connecting shaft, to enable the lamp body to be rotated relative to the connecting portion in a vertical plane; and a tension knob, the tension knob is arranged on the other side of the connecting end relative to the connecting portion and is connected to the connecting shaft, such that a relative distance between the connecting end and the connecting portion on the connecting shaft is adjusted, to achieve angle adjustment and fixation of the lamp body.

4. The fiber optic ground spike light fixture according to claim 3, wherein meshing teeth are formed on one surface of the connecting end and one surface of the connecting portion that are opposite to each other respectively, and the connecting end is meshed with the connecting portion when an angle of the lamp body is fixed.

5. The fiber optic ground spike light fixture according to claim 1, wherein the lamp body further comprises:

a power supply unit, wherein the power supply unit is snap-fitted and fixed at the bell mouth of the lamp body, and one end of the fiber optic bundle is fixed on the power supply unit to obtain power; and a convex rib, wherein the convex rib is formed on an outer wall of the lamp body in an axial direction.

6. The fiber optic ground spike light fixture according to claim 1, wherein the second end of the ground spike tube forms a conical structure to facilitate the insertion of the ground spike tube into the installation surface, and the fiber optic ground spike light fixture is fixed on the installation surface through cooperation between the ground spike tube and the ground spike plate.

* * * * *